United States Patent
Fell, Jr.

(10) Patent No.: US 6,826,624 B1
(45) Date of Patent: Nov. 30, 2004

(54) METHOD AND APPARATUS FOR NETWORK RESOURCE ACCESS REQUEST REDIRECTION

(75) Inventor: Channing W. Fell, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,644

(22) Filed: Dec. 9, 1999

(51) Int. Cl.[7] .............................................. G06F 15/16
(52) U.S. Cl. ..................................................... 709/245
(58) Field of Search ............................ 709/203, 501.1, 709/513, 217, 218, 219, 223, 227, 232, 245; 707/104.1

(56) References Cited

U.S. PATENT DOCUMENTS

| | | | | |
|---|---|---|---|---|
| 5,802,299 | A | * | 9/1998 | Logan et al. ............... 709/218 |
| 6,092,100 | A | * | 7/2000 | Berstis et al. ............... 709/203 |
| 6,167,427 | A | * | 12/2000 | Rabinovich et al. ........ 709/201 |
| 6,189,030 | B1 | * | 2/2001 | Kirsch et al. ............... 709/224 |
| 6,408,296 | B1 | * | 6/2002 | Acharya et al. .............. 707/10 |
| 6,466,966 | B1 | * | 10/2002 | Kirsch et al. ............... 709/203 |
| 6,578,078 | B1 | * | 6/2003 | Smith et al. ................. 709/224 |
| 6,643,658 | B1 | * | 11/2003 | Jai et al. ..................... 707/100 |
| 6,654,807 | B2 | * | 11/2003 | Farber et al. ............... 709/225 |
| 2002/0112036 | A1 | * | 8/2002 | Bohannon et al. .......... 709/220 |
| 2003/0046361 | A1 | * | 3/2003 | Kirsch et al. ............... 709/217 |
| 2003/0069992 | A1 | * | 4/2003 | Ramig ........................ 709/245 |
| 2003/0112792 | A1 | * | 6/2003 | Cranor et al. ............... 370/352 |
| 2003/0208472 | A1 | * | 11/2003 | Pham ............................ 707/2 |
| 2004/0122863 | A1 | * | 6/2004 | Sidman .................... 707/104.1 |

FOREIGN PATENT DOCUMENTS

| | | | | |
|---|---|---|---|---|
| WO | WO 00/46696 | * | 8/2000 | ......... G06F/17/30 |
| WO | WO 02/13057 A1 | * | 2/2002 | ......... G06F/17/30 |

OTHER PUBLICATIONS

Howes, T., et al., The LDAP Application Program Interface; Aug. 1995; pp. 1–22.

\* cited by examiner

*Primary Examiner*—Glenton B. Burgess
*Assistant Examiner*—Kimberly Flynn
(74) *Attorney, Agent, or Firm*—Duke W. Yee; Thomas E. Tyson; Wayne P. Bailey

(57) ABSTRACT

Method and apparatus for redirection resource access requests based on a requested resource identifier. When a user device broadcasts a network resource access request, the request is received by a Scalable, High Availability, Server Resource Redirection (SHASSR) apparatus. The request includes a requested resource identifier which is checked against a directory to determine if the resource identifier has changed. If so, a current resource identifier is returned to the SHASSR apparatus which sends out another network resource access request using the current resource identifier.

25 Claims, 3 Drawing Sheets

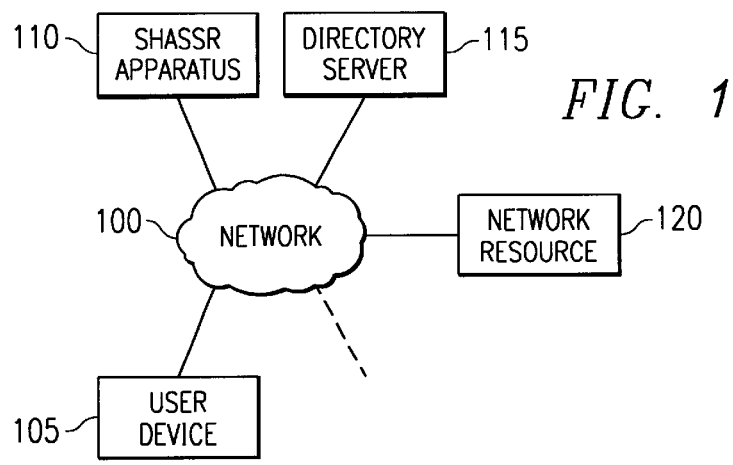
FIG. 1
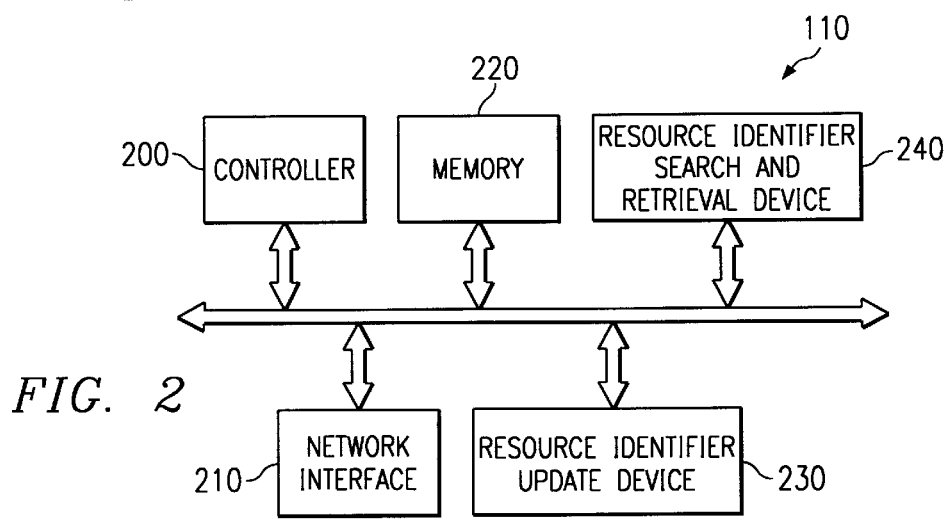
FIG. 2
| CURRENT RESOURCE LOCATION | PREVIOUS RESOURCE LOCATIONS |
|---|---|
| www.ibm.com/products | www.ibm.com/merchandise<br>www.ibm.com/stuff |
| www.goodforyou.com | www.good4u.com |
| www.bikes.com/wheels | www.bikes.com/tires<br>www.bikes.com/tubes<br>www.bikes.com/spokes |
| ⋮ | ⋮ |
FIG. 5

US 6,826,624 B1

METHOD AND APPARATUS FOR NETWORK RESOURCE ACCESS REQUEST REDIRECTION

BACKGROUND OF THE INVENTION

1. Technical Field

The invention is directed to a method and apparatus for network resource access request redirection. Specifically, the invention is directed to a method and apparatus for determining a current resource identifier of a resource in a resource access request.

2. Description of Related Art

As the Internet and other wide area networks become increasingly more popular across the world, more and more businesses and people are establishing their presence on the Internet by creating Web pages and network resource locations. A user of the Internet, for example, may locate these businesses and persons by entering a location identifier, such as a universal resource locator.

The URL is an address that defines the route to a file on the World Wide Web or any other Internet facility. URLs are typed into a Web browser to access Web pages. The URL contains the protocol prefix, domain name, subdirectory names and file name of the Internet resource to which access is requested. For example, "http://www.ibm.com" retrieves the home page at IBM's Web site. The "http://" is the Web protocol, and "www.ibm.com" is the domain name.

If the Web page is stored in another directory, or if a Web page other than the home page is required, slashes are used to separate the names. For example, the URL "http://www.ibm.com/products" points to a product listing page on the IBM Web site.

If a required Web page is stored in a subdirectory, its name is separated by a slash. These subdirectories can be several levels deep. For example, the components of the following URL are described below:

http://www.jerids.com/clothes/shirts/formal.html where "http://" is the protocol, "www.jerids.com/" is the domain name, "clothes/" is the subdirectory name, "shirts/" is another subdirectory name, and "formal.html" is the document name, i.e. the Web page.

Many times as Web sites are updated and changed, Web pages are modified, rearranged, renamed and the like. As a result, the URL of the Web page may be modified such that a user using the original URL will not be able to find the Web page without having to invoke the aid of a search engine such as Lycos™ or Yahoo™. This may be detrimental, for example, to Internet based businesses that rely on their customers and potential customers to be able to locate their Web pages to shop at their on-line stores.

Thus, there is a need for new technology to provide a mechanism through which network resource identifiers may be modified while allowing users of the network to request access to network resources using the original network resource identifiers.

SUMMARY OF THE INVENTION

The present invention provides a method and apparatus for determining a current resource identifier of a resource in a resource access request. With the method and apparatus of the invention, when a user device wishes to access a network resource, for example, the user device broadcasts an access request across the network. The access request includes a resource identifier. The apparatus monitors the broadcasts over the network and checks the access requests to verify that the resource identifier used in the access requests is the most current resource identifier associated with the requested resource. If the resource identifier in an access request is not the most recent resource identifier, the apparatus redirects the access request using a current resource identifier and may notify the user device of the change in the resource identifier.

The apparatus makes use of a directory server to verify the resource identifiers. The directory server includes a directory of the current resource identifiers and all previously related resource identifiers. Thus, by searching the directory, the directory server may identify a network resource by its current resource identifier even if an older resource identifier is used in a resource access request.

Once the apparatus has retrieved the current resource identifier from the directory server, the current resource identifier is used by the apparatus to redirect the access request to the intended network resource. In addition, the apparatus may return a message to the user device indicating that the resource identifier has changed and indicating the current resource identifier. This message may be output by the user device as a displayed text and/or graphical message, audio message, or the like.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals reference like elements, and wherein:

FIG. 1 is an exemplary block diagram of a system in which the present invention may be used;

FIG. 2 is an exemplary block diagram of the SHASSR apparatus of FIG. 1;

FIG. 5 is an exemplary diagram of a current resource identifier directory; and

DETAILED DESCRIPTION OF THE PREFERRED EMBODIMENT

Figure 3:
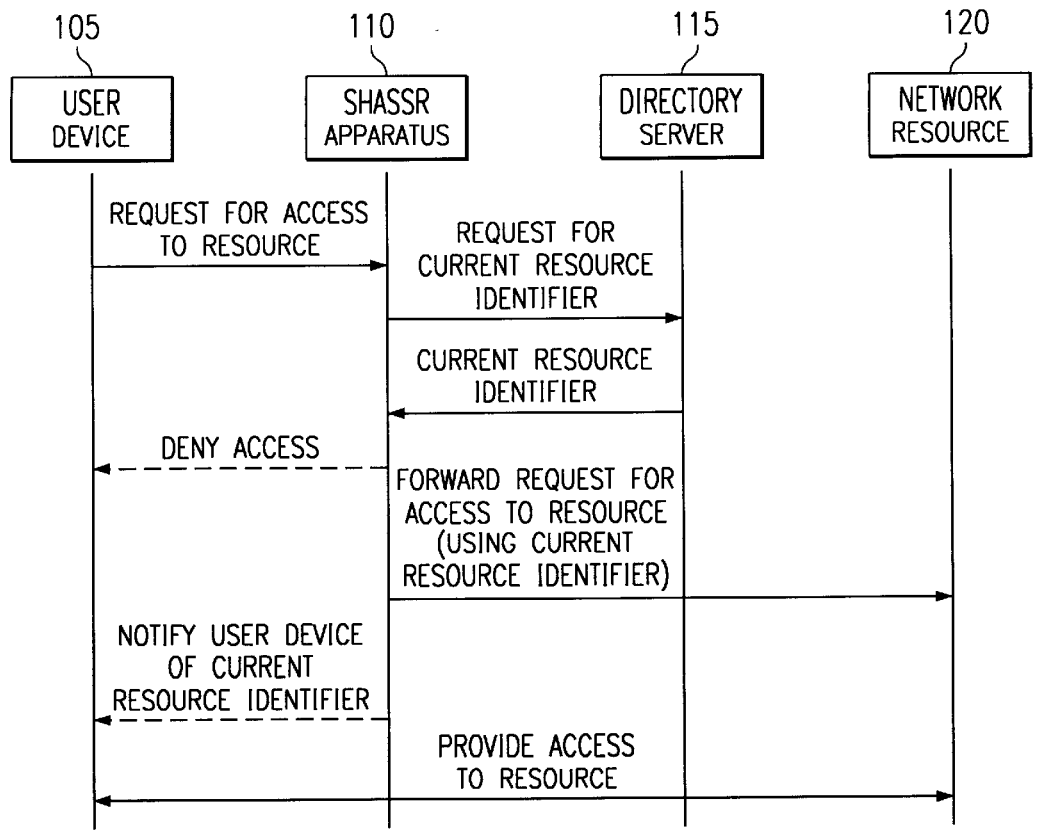
FIG. 3 is an exemplary message flow diagram of the system of FIG. 1.

FIG. 1 is an exemplary block diagram of a system in which the present invention may be used. As shown in FIG. 1, the system includes at least one network 100, at least one user device 105, a Scalable, High Availability, Server Resource Redirection. (SHASSR) apparatus 110, a directory server 115, and at least one target resource 120.

The network 100 may be any type of network capable of routing data transmissions from one network device to another. For example, the network 100 may be a local area network (LAN), wide area network (WAN), intranet, the Internet, and the like. Furthermore, the network 100 may include a plurality of networks of the same or different types. Thus, a company's proprietary intranet may be used in conjunction with a WAN and be considered the network 100.

The network 100 routes data transmissions to and from network devices, such as the user device 105. The user device 105 may be any type of device that is capable of sending and/or receiving data transmissions via the network 100. For example, the user device 105 may be a personal computer, computer terminal, personal digital assistant (PDA), point of sale device, and the like.

When the user device 105 wishes to access a network resource 120, for example, the user device 105 broadcasts an access request across the network 100. The access request includes a resource identifier. Any network resource associated that is assigned the resource identifier broadcast by the user device 105 will respond to the broadcast by providing access to the requested resource, assuming the user device 105 is an authorized user of the requested resource.

In addition, the SHASSR apparatus 110 monitors the broadcasts over the network 100 and checks the access requests broadcast over the network 100 to verify that the resource identifier used in the access requests is the most current resource identifier associated with the resource. If the resource identifier in an access request is not the most recent resource identifier, the SHASSR apparatus 110 redirects the access request using the current resource identifier and may notify the user device 105 of the change in the resource identifier.

The SHASSR apparatus 110 may be a dedicated hardware device in communication with the network 100 or may be incorporated into, for example, one or more network servers. The SHASSR apparatus 110 may further be implemented as a software program running on a network computing device, such as a network or Web server, router, or the like.

The SHASSR apparatus 110 makes use of a directory server 115 to verify the resource identifiers. The directory server 115 includes a directory of the current resource identifiers and all previously related resource identifiers. Thus, by searching the directory, the directory server 115 may identify a network resource by its current resource identifier even if an older resource identifier is used in a resource access request.

The directory server 115 may be any type of directory server 115 known to those of ordinary skill in the art. Furthermore, the directory server 115 may be a Lightweight Directory Access Protocol (LDAP) server. LDAP is described, for example, in RFC 1823, available on the Internet at www.ietf.org/rfc.html.

The directory server 115 is periodically updated such that the resource identifiers in the directory of current resource identifiers is maintained as current as possible for the particular implementation of the invention. The directory server 115 or the SHASSR apparatus 110 may periodically request each server of each domain to which it has access, to upload their current resource identifiers along with a previously used resource identifier, if one exists. In this way, the directory server 115 or the SHASSR apparatus 110 may correlate the current resource identifier with a previously used resource identifier in the directory and maintain the relationship between the current resource identifier and all previously used resource identifiers.

Alternatively, the directory in the directory server 115 may be updated automatically whenever the resource identifiers on a network server are changed. For example, if a Web page URL on an Internet server is changed, the Internet server may automatically upload the current and previously used URL for the Web page to the directory server 115 or the SHASSR apparatus 110 when the change is completed.

While FIG. 1 shows the SHASSR apparatus 110 and the directory server 115 as separate devices that communicate via the network 100, the invention is not limited to such an embodiment. Rather, the SHASSR apparatus 110 and the directory server 115 may be incorporated into a single device or may be distributed among a plurality of devices associated with the network 100.

In addition, while FIG. 1 shows the SHASSR apparatus 110 monitoring all traffic on the network 100, the invention is not limited to such an embodiment. Rather, there may be a plurality of SHASSR apparatus 110 and directory servers 115 with each SHASSR apparatus 110/directory server 115 servicing one or more domains. The SHASSR apparatus 110/directory server 115 may be provided administrative authority over all devices in a domain by providing the SHASSR apparatus 110/directory server 115 with an administrative identification that may be used with each device in the domain to obtain information about the device and its resources.

Once the SHASSR apparatus 110 has retrieved the current resource identifier from the directory server 115, the current resource identifier is used by the SHASSR apparatus 110 to redirect the access request to the intended network resource 120, for example. In addition, the SHASSR apparatus 110 may return a message to the user device 105 indicating that the resource identifier has changed and indicating the current resource identifier. This message may be output by the user device 105 as a displayed text and/or graphical message, audio message, or the like.

For example, the user device 105 may output the message as a pop-up window (generally known in the art) that contains the text: "The URL that you entered has changed. The new URL is http://www.ibm.com/support. Please make a note of it," or the like. The user of the user device 105 may then copy the URL into their directory of URLs for future use.

With the present invention as described above, a user may enter a resource identifier, such as a URL, with which he/she is familiar in an effort to access a network resource and gain access to the network resource even if the entered resource identifier is no longer current. Furthermore, the user may be informed of the resource identifier change so that he/she may use the current resource identifier in the future.

FIG. 2 is an exemplary block diagram of the SHASSR apparatus 110. As shown in FIG. 2, the SHASSR apparatus includes a controller 200, a network interface 210, a memory 220, a resource identifier update device 230 and a resource identifier search and retrieval device 240. These elements 200–240 communicate with one another via the control/signal bus 250. Although a bus architecture is shown in FIG. 2, the invention is not limited to such an embodiment. Rather any architecture that provides for the communication between elements 200–240 may be used without departing from the spirit and scope of the invention.

When a user device 105 broadcasts a resource access request across network 100, the request is received by the SHASSR apparatus 110 via the network interface 210. In response to receiving a resource access request, the controller 200, under the guidance of control programs stored in memory 220, instructs the resource identifier search and retrieval device 240 to send a search request to the directory server 115 for the current resource identifier of the requested resource.

As noted above, the directory server 115 may be a separate server or may be incorporated into the SHASSR apparatus 110. If the directory server 115 is incorporated into the SHASSR apparatus 110, the functions of the resource identifier search and retrieval device 240 may be combined with the functions of the directory server 115 such that the controller 200 instructs the resource identifier search and retrieval device 240 to search a resource identifier directory for the current resource identifier.

In either implementation, the directory of current resource identifiers is searched to determine if the requested resource identifier matches a current resource identifier. If a match is found, the SHASSR apparatus 110 does not perform any additional functions. If a match is not found, the resource identifier search and retrieval device 240 either instructs the directory server 115 or performs the search itself of the directory of current resource identifiers to determine if a previously used resource identifier matches the requested resource identifier.

If a match is not found in the previously used resource identifiers, the SHASSR apparatus 110 need not perform any additional functions with regard to the user device 105 request. Optionally, the SHASSR apparatus 110 may return a message to the user device 105 indicating that a resource having the requested resource identifier does not exist.

If a match is found in the previously used resource identifiers, the resource identifier search and retrieval device 240 returns the current resource identifier associated with the previously used resource identifier to the controller 200. The controller 200 then issues an access request using the current resource identifier and the information in the original access request such that the requested resource will provide access to the user device 105, assuming the user device 105 is an authorized user of the requested resource. In addition, the controller 200 may send a message to the user device 105 via the network interface 210, indicating that the resource identifier has changed and what the current resource identifier is.

The SHASSR apparatus 110 shown in FIG. 2 includes the resource identifier update device 230. In one embodiment, the resource identifier update device 230 sends periodic requests, via the network interface 210, for current resource identifier directory updates to the network servers and updates the directory accordingly based on the information sent from the network servers in reply to the request. As noted above, this function may also be performed entirely within the directory server 115. Thus, in an embodiment where the directory of current resource identifiers is updated entirely within the directory server 115, the resource identifier update device 230 is not a necessary element to the SHASSR apparatus 230.

FIG. 3 is an exemplary message flow diagram of the system of FIG. 1. As shown in FIG. 3, the message flow starts with the user device 105 broadcasting a request for access to a resource across the network 100. The SHASSR apparatus 110 receives the broadcast from the user device 105 and sends a request to the directory server 115 for a current resource identifier. This message may be performed internally to the SHASSR apparatus 110 if the directory server 115 functions are incorporated into the SHASSR apparatus 110 as discussed above.

The directory server 115 then returns a current resource identifier message to the SHASSR apparatus 110. If the current resource identifier message indicates that the requested resource identifier is the current resource identifier, no further operations by the SHASSR apparatus 110 are necessary with regard to the access request from the user device 105. If the current resource identifier message indicates that the current resource identifier was not found, the SHASSR apparatus 110 may return an "access denied" or "resource not found" message to the user device 105 (shown as a dashed arrow).

If the current resource identifier message indicates a different resource identifier from that of the requested resource identifier, the SHASSR apparatus 110 forwards the access request from the user device 105 to the requested network resource 120 using the current resource identifier. This may be done by sending another broadcast across the network 100 using the current resource identifier, for example. Optionally, the SHASSR apparatus 110 may also send a message back to the user device 105 indicating the change in the resource identifier. The user device 105 may then negotiate with the network resource 120 for access to the network resource 120.

Figure 4:
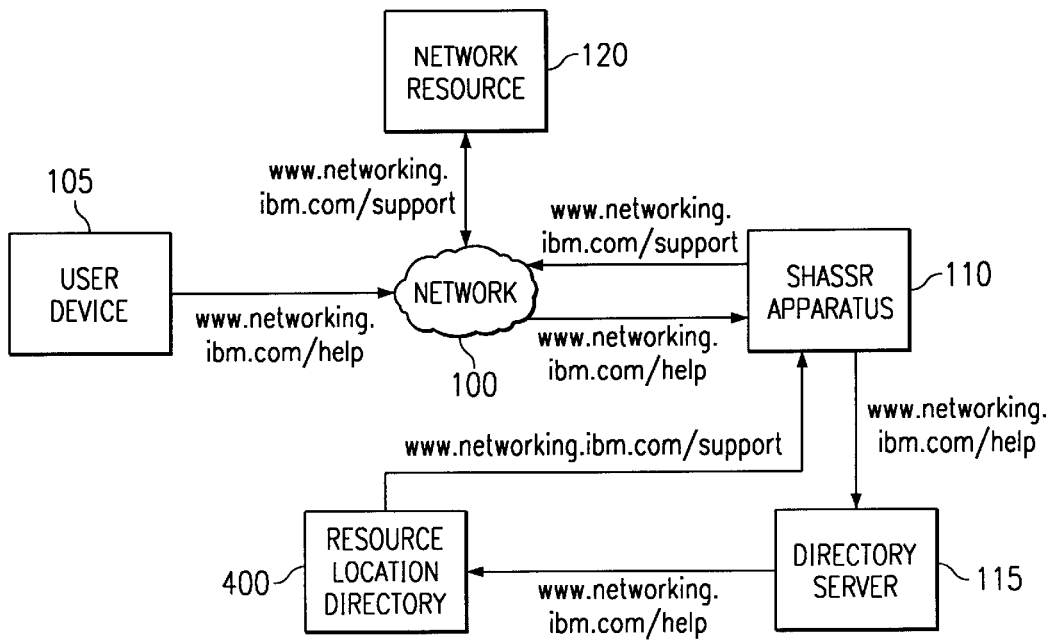
FIG. 4 is an exemplary diagram illustrating the conversion of an original network resource identifier into a current network resource identifier.

FIG. 4 is an exemplary diagram of an embodiment of the invention illustrating the conversion of an original network resource URL into a current network resource URL. As shown in FIG. 4, the user device 105 broadcasts a request for access to the Web page having the URL "www.networking.ibm.com/help" across the network 100. As a result, the SHASSR apparatus 110 receives the access request and sends a request to the directory server 115 requesting the current URL for the Web page associated with "www.networking.ibm.com/help."

The directory server 115 looks up the current URL for the Web page in the current resource identifier directory 400 and sends the current URL, "www.networking.ibm.com/support" back to the SHASSR apparatus 110. The SHASSR apparatus 110 then broadcasts another access request using the information from the user device 105 access request and the current resource URL "www.networking.ibm.com/support." Based on the new access request, the user device 105 is then provided with access to the network resource 120 via the network 100, assuming the user device 105 is an authorized user of the network resource 120.

FIG. 5 is an exemplary diagram of the current resource identifier directory 400 of FIG. 4. As shown in FIG. 5, the current resource identifier directory 400 includes a field 410 for a current resource identifier and a field 420 for previous resource identifiers. For example, as shown in FIG. 5, the Web page having URL "www.good4u.com" has been changed to "www.goodforyou.com." Also as shown in FIG. 5, the Web pages having URLs "www.bikes.com/tires," "www.bikes.com/tubes," and "www.bikes.com/spokes" have been combined into the new Web page "www.bikes.com/wheels."

When the directory server 115 receives a request for a current resource identifier, the directory server first searches field 410 to determine if the requested resource identifier is present in field 410. If so, then the requested resource identifier and the current resource identifier are the same.

If the requested resource identifier is not in field 410, then the directory server 115 searches field 420 for the requested resource identifier. If the requested resource identifier is not found in field 420, the resource may not exist. Thus, the SHASSR apparatus 110 may send a "resource does not exist" message back to the user device 105. If the requested resource identifier is in field 420, the directory server 115 sends a current resource identifier message back to the SHASSR apparatus 110 indicating the current resource identifier which is then used by the SHASSR apparatus to broadcast a new access request with the current resource identifier.

Figure 6:
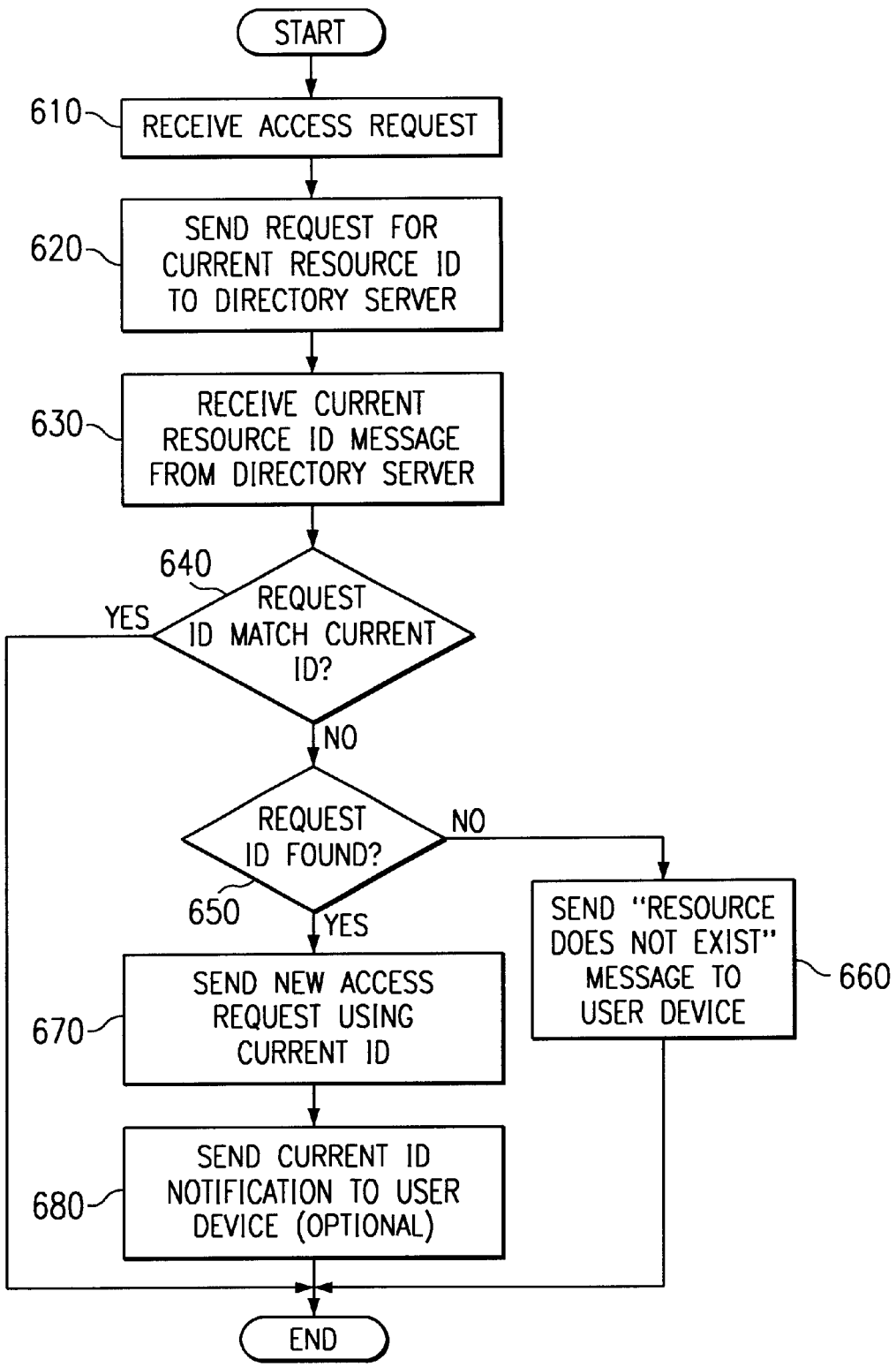
FIG. 6 is a flowchart outlining an exemplary operation of the SHASSR apparatus.

FIG. 6 is a flowchart outlining an exemplary operation of the SHASSR apparatus, such as SHASSR apparatus 110 in FIG. 1. The operation starts with the SHASSR apparatus receiving an access request via the network (step 610). In response to receiving the access request from the user device, the SHASSR apparatus sends a request to the directory server requesting the current resource identification for the requested resource (step 620).

The directory server returns a current resource identifier message to the SHASSR apparatus (step 630) which then determines if the current resource identification is the same as the resource identification included with the access request from the user device (step 640). If so (step 640:YES), the SHASSR apparatus does not perform any more functions and ends with regard to the access request from the user device. If the current resource identifier is not the same as the request resource identifier (step 640:NO), the SHASSR apparatus determines if the request resource identifier was found in the directory of the directory server (step 650). In other words, the SHASSR apparatus determines if a current resource identifier was returned in the resource identifier message from the directory server.

If the request resource identifier was not found (step 650:NO), the SHASSR apparatus sends a "resource does not exist" message to the user device and ends (step 660). If the request resource identifier was found (step 650:YES), the SHASSR apparatus sends a new access request message using the current resource identifier forwarded by the directory server (step 670). Optionally, the SHASSR apparatus may send a notification message to the user device indicating that the resource identifier has changed and what the current resource identifier is (step 680). Control then ends.

In addition to the above functions, the SHASSR apparatus 110 may also perform a user device authentication function in which the SHASSR apparatus 110 not only determines the current resource identifier for a requested resource but also performs an authentication to determine if the user device is an authorized user of the requested resource. Such an authentication function may be performed by including in the current resource identifier directory 400 an additional field or fields to identify the authorized users of a network resource. The SHASSR apparatus 110 may then compare an identification of the user device 105 sent with the access request message against the listing of authorized users in the directory 400.

If the user device 105 is not an authorized user of the requested resource, the SHASSR apparatus 110 may send an access denied message back to the user device 105 and not provide the user device 105 with the current resource identifier. If the user device 105 is an authorized user, the operation of the SHASSR apparatus 110 would be essentially the same as described above in the preferred embodiments.

With the present invention, a user may enter an obsolete resource identifier and automatically be routed to the correct resource using the current, i.e. updated, resource identifier. In this way, the user is not forced to perform a search, such as text search using search engines, to hopefully find the resource he/she wishes to access. The owner of the network resource is benefited in that he/she can change the resource identifier and still be assured that his/her customers and potential customers will still be able to access the resource even if they use the obsolete resource identifier.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for redirecting a resource access request for a requested resource, comprising:

monitoring a network for resource access requests from a user requesting access to a resource, wherein each resource access request includes a requested resource identifier for said requested resource;

determining a current resource identifier for addressing said requested resource by searching a directory for the current resource identifier using the requested resource identifier; and redirecting said resource access request over the network to said requested resource using said current resource identifier responsive to a determination that said requested resource identifier is different from said current resource identifier, by using said current resource identifier instead of said requested resource identifier in the redirected resource access request redirected to said requested resource, wherein resource identifiers are selectively modified in the monitored resource access requests to allow users of the network to request access to network resources using both current and outdated resource identifiers and such access using both current and outdated resource identifiers is transparent to the requested resource, wherein searching the directory includes:

searching for the requested resource identifier in a plurality of fields used for storing current resource identifiers; and if the requested resource identifier is not in any of the plurality of fields used for storing current resource identifiers, searching for the requested resource identifier in a plurality of fields used for storing previous resource identifiers, wherein for each resource a plurality of the fields for storing previous resource identifiers are associated with a field for storing a current resource identifier for the resource.

2. The method of claim 1, wherein if the requested resource identifier is stored in one of the plurality of fields used for storing previous resource identifiers, identifying a field used for storing current resource identifiers that is associated with the one of the plurality of fields used for storing previous resource identifiers, and using as the current resource identifier for addressing said requested resource a resource identifier that is stored in the field for storing current resource identifiers that is associated with the one of the plurality of fields used for storing previous resource identifiers.

3. The method of claim 1, further comprising:

prior to redirecting the resource access request, performing an authentication process on the resource access request.

4. The method of claim 3, wherein the resource access request is received from a user device and wherein if the authentication process indicates that the user device is not an authorized user of the requested resource, the redirection step is not performed.

5. The method of claim 1, wherein the determining, and redirecting steps are performed in a network router.

6. A computer program product in a computer readable medium for redirecting a resource access request for a requested resource, comprising:

instructions for monitoring a network for resource access requests from a user requesting access to a resource, wherein each resource access request includes a requested resource identifier for said requested resource;

instructions for determining a current resource identifier for addressing said requested resource by searching a directory for the current resource identifier using the requested resource identifier; and instructions for redirecting said resource access request over the network to said requested resource using said current resource identifier responsive to a determination that said requested resource identifier is different from said current resource identifier, by using said current resource identifier instead of said requested resource identifier in the redirected resource access request redirected to said requested resource, wherein resource identifiers are selectively modified in the monitored resource access requests to allow users of the network to request access to network resources using both current and outdated resource identifiers and such access using both current and outdated resource identifiers is transparent to the requested resource, wherein the instructions for searching the directory include:

instructions for searching for the requested resource identifier in a plurality of fields used for storing current resource identifiers; and instructions for searching for the requested resource identifier in a plurality of fields used for storing previous resource identifiers if the requested resource identifier is not in any of the plurality of fields, wherein for each resource a plurality of the fields for storing previous resource identifiers are associated with a field for storing a current resource identifier for the resource.

7. The computer program product of claim 6, wherein if the requested resource identifier is stored in one of the plurality of fields used for storing previous resource identifier, identifying a field used for storing current resource identifiers that is associated with the one of the plurality of fields used for storing previous resource identifiers, and using as the current resource identifier for addressing said requested resource a resource identifier that is stored in the field for storing current resource identifiers that is associated with the one of the plurality of fields used for storing previous resource identifiers.

8. The computer program product of claim 6, further comprising:

instructions for performing an authentication process on the resource access request prior to redirecting the resource access request.

9. The computer program product of claim 8, wherein the resource access request is received from a user device and wherein the computer program product further includes instructions for not performing the redirection step if the authentication process indicates that the user device is not an authorized user of the requested resource.

10. A resource access request redirection apparatus that redirects a resource access request for a requested resource, comprising:

monitoring means for monitoring a network for resource access requests from a user requesting access to a resource, wherein each resource access request includes a requested resource identifier for said requested resource;

a current resource identifier device that determines a current resource identifier for addressing said requested resource by searching a directory for the current resource identifier using the requested resource identifier; and a controller that redirects said resource access request over the network to said requested resource using said current resource identifier responsive to a determination that said requested resource identifier is different from said current resource identifier, by using said current resource identifier instead of said requested resource identifier in the redirected resource access request redirected to said requested resource, wherein resource identifiers are selectively modified in the monitored resource access requests to allow users of the network to request access to network resources using both current and outdated resource identifiers and such access using both current and outdated resource identifiers is transparent to the requested resource, wherein the current resource identifier determination device searches the directory by:

searching for the requested resource identifier in a plurality of fields used for storing current resource identifiers; and if the requested resource identifier is not in any of the plurality of fields, searching for the requested resource identifier in a plurality of fields used for storing previous resource identifiers, wherein for each resource a plurality of the fields for storing previous resource identifiers are associated with a field for storing a current resource identifier for the resource.

11. The apparatus of claim 10, wherein if the requested resource identifier is stored in one of the plurality of fields used for storing previous resource identifiers, identifying a field used for storing current resource identifiers that is associated with the one of the plurality of fields used for storing previous resource identifiers, and using as the current resource identifier for addressing said requested resource a resource identifier that is stored in the field for storing current resource identifiers that is associated with the one of the plurality of fields used for storing previous resource identifiers.

12. The apparatus of claim 10, wherein prior to redirecting the resource access request, the controller performs an authentication process on the resource access request.

13. The apparatus of claim 12, wherein the resource access request is received from a user device and wherein if the authentication process indicates that the user device is not an authorized user of the requested resource, the controller does not perform the redirection step.

14. The apparatus of claim 10, wherein the current resource identifier determination device and the controller are part of a network router.

15. A resource access request redirection system for redirecting a resource access request for a requested resource, comprising:

a directory server that includes, for each resource, a field for storing a current resource identifier that addresses a particular resource, and a plurality of fields for storing previous resource identifiers that were previously used to address a particular resource, wherein for each resource the plurality of fields for storing previous resource identifiers are associated with the field for storing a current resource identifier, wherein the directory server monitors a network for resource access requests, wherein each resource access request includes a requested resource identifier, and wherein the server determines whether a requested resource identifier is a current resource identifier by searching the plurality of fields for storing previous resource identifiers and the field for storing a current resource identifier; and a redirection device that redirects the resource access request to the requested resource using the current resource identifier, by using said current resource identifier instead of said requested resource identifier in the redirected resource access request, wherein resource identifiers are selectively modified in the monitored resource access requests.

16. The system of claim 15, wherein the directory server searches by:

searching for the requested resource identifier first in the field for storing a current resource identifier; and if the requested resource identifier is not in the field for storing a current resource identifier, searching for the requested resource identifier in each one of the plurality of fields for storing previous resource identifiers.

17. The system of claim 15, wherein if the requested resource identifier is stored in one of the plurality of fields used for storing previous resource identifiers, identifying a field used for storing current resource identifiers that is associated with the one of the plurality of fields used for storing previous resource identifiers, and using as the current resource identifier for addressing said requested resource a resource identifier that is stored in the field for storing current resource identifiers that is associated with the one of the plurality of fields used for storing previous resource identifiers.

18. The system of claim 15, wherein the requested resource identifier is received from a user device and wherein the redirection device sends a current resource identifier to the user device.

19. The system of claim 15, wherein the redirection device redirects the resource access request by sending another resource access request using the current resource identifier.

20. The system of claim 15, wherein prior to redirecting the resource access request, either the directory server or the redirection device performs an authentication process on the resource access request.

21. The system of claim 20, wherein the resource access request is received from a user device and wherein if the authentication process indicates that the user device is not an authorized user of the requested resource, the redirection device does not perform redirection of the resource access request.

22. The system of claim 15, wherein the resource is an Internet Web page.

23. The system of claim 15, the requested resource identifier and current resource identifier are universal resource locators.

24. The system of claim 15, wherein the directory server and the redirection device are integrated into a single device.

25. The system of claim 15, wherein the directory server and the redirection device are integrated into a single network or Web server.

* * * * *

UNITED STATES PATENT AND TRADEMARK OFFICE
CERTIFICATE OF CORRECTION

PATENT NO. : 6,826,624 B1
DATED : November 30, 2004
INVENTOR(S) : Fell, Jr.

It is certified that error appears in the above-identified patent and that said Letters Patent is hereby corrected as shown below:

Drawings,
Replace Figure 2, as shown on the attached page.

Column 12,
Line 26, after "claim 15," insert -- wherein --.

Signed and Sealed this

Twenty-fifth Day of April, 2006

JON W. DUDAS
*Director of the United States Patent and Trademark Office*

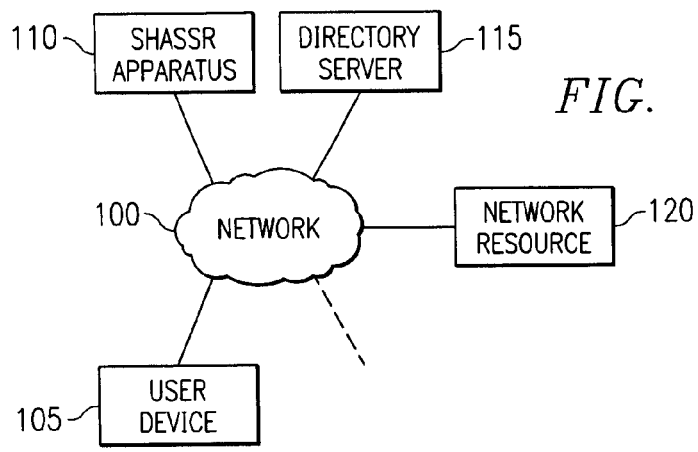
FIG. 1
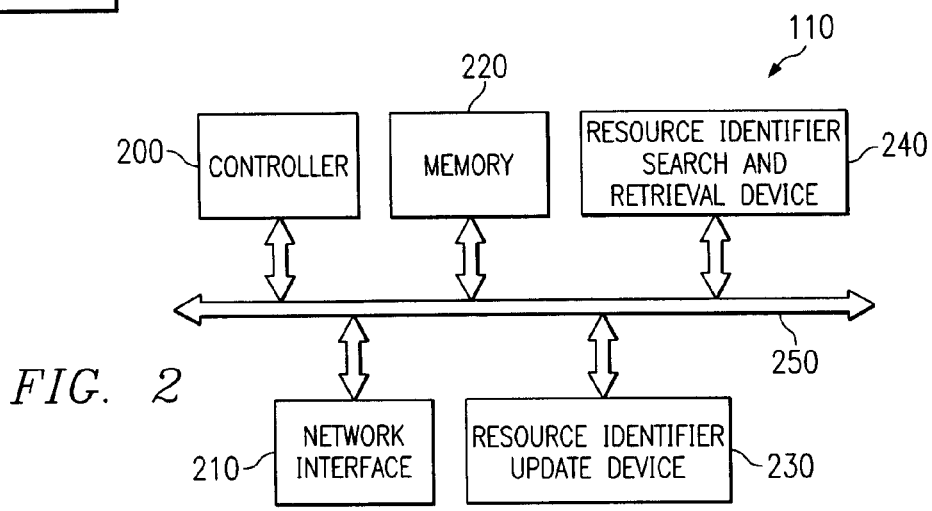
FIG. 2
FIG. 5
| CURRENT RESOURCE LOCATION | PREVIOUS RESOURCE LOCATIONS |
|---|---|
| www.ibm.com/products | www.ibm.com/merchandise<br>www.ibm.com/stuff |
| www.goodforyou.com | www.good4u.com |
| www.bikes.com/wheels | www.bikes.com/tires<br>www.bikes.com/tubes<br>www.bikes.com/spokes |
| ⋮ | ⋮ |